W. J. BAKER.
COMBINED PROPELLED AND DRAWN VEHICLE.
APPLICATION FILED OCT. 30, 1915.
1,277,358.
Patented Sept. 3, 1918.
2 SHEETS—SHEET 1.
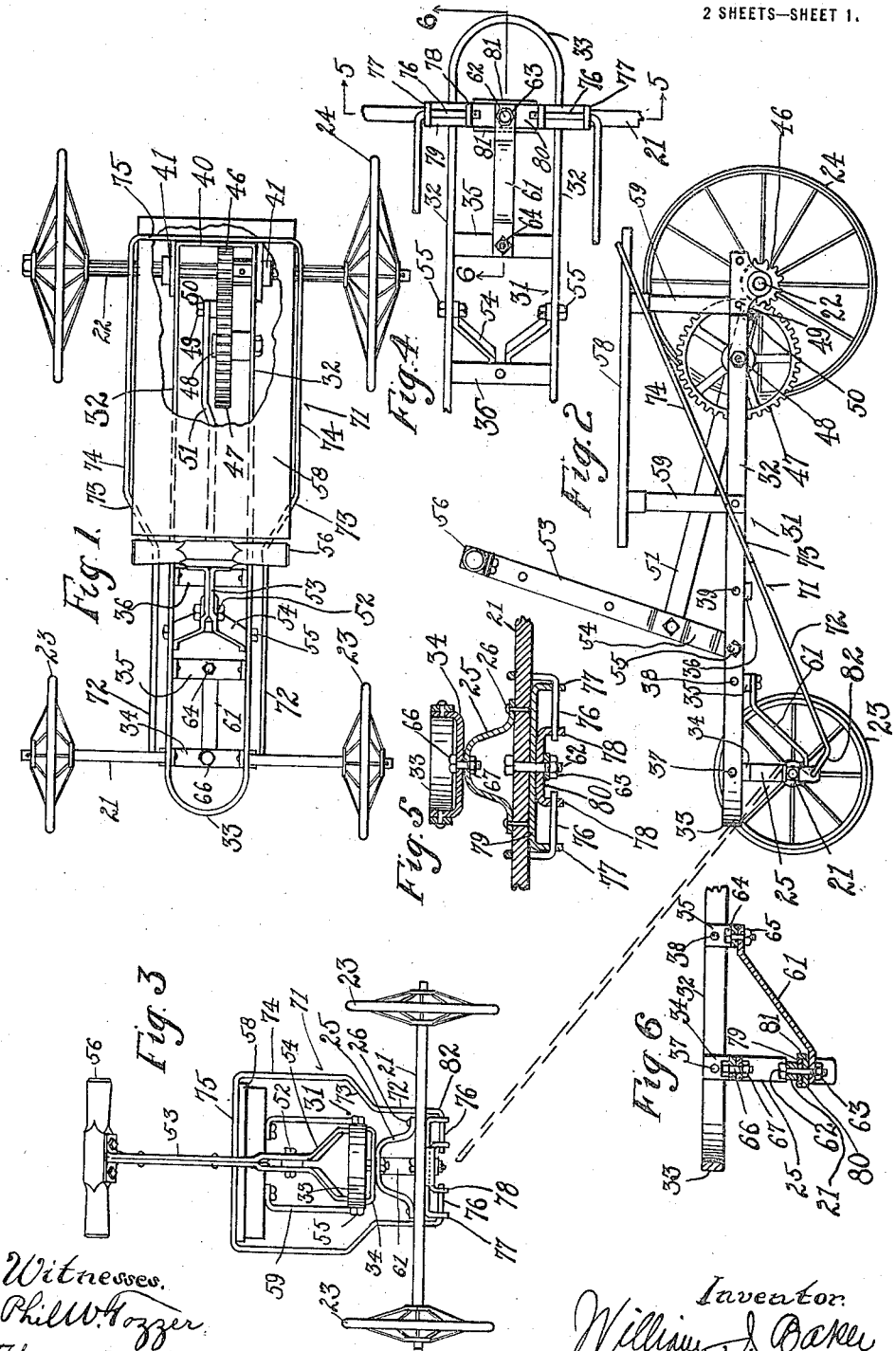

W. J. BAKER.
COMBINED PROPELLED AND DRAWN VEHICLE.
APPLICATION FILED OCT. 30, 1915.
1,277,358.
Patented Sept. 3, 1918.
2 SHEETS—SHEET 2.
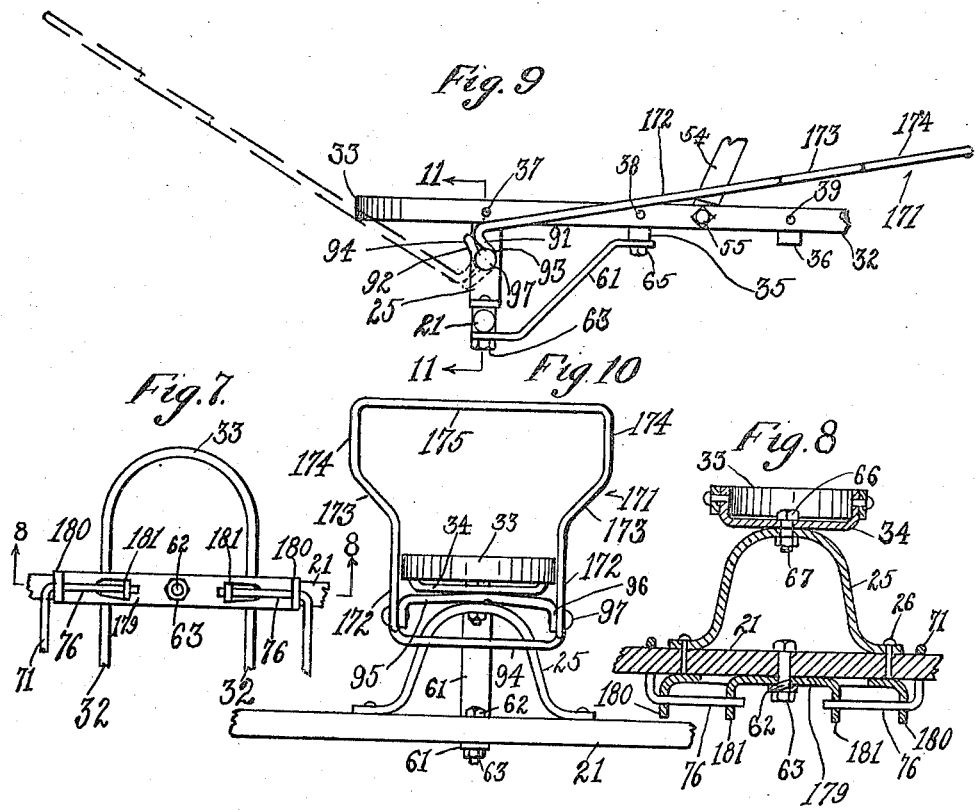
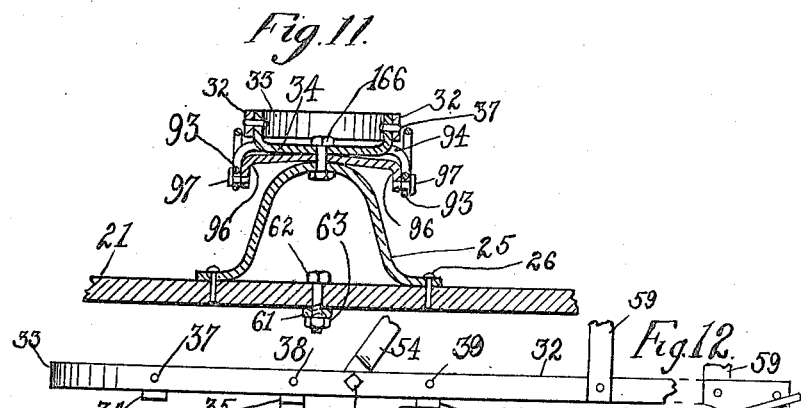

UNITED STATES PATENT OFFICE.

WILLIAM J. BAKER, OF NEWPORT, KENTUCKY.

COMBINED PROPELLED AND DRAWN VEHICLE.

1,277,358.

Specification of Letters Patent. Patented Sept. 3, 1918.

Application filed October 30, 1915. Serial No. 58,798.

*To all whom it may concern:*

Be it known that I, WILLIAM J. BAKER, a citizen of the United States, residing at Newport, in the county of Campbell and State of Kentucky, have invented certain new and useful Improvements in Combined Propelled and Drawn Vehicles, of which the following is a specification.

My invention relates to vehicles arranged to be propelled by the rider, principally of the juvenile class, and has for its object the provision of means whereby the location of the front axle may be adjusted for accommodating the lengths of the child's legs, so that the distance between the seat and front axle may be adjusted to accommodate for the growth of the child using the vehicle or for children of different sizes.

It is the object of my invention, further, to provide the vehicle with novel means whereby the vehicle is readily converted into a drawn vehicle, the latter means being placed in out of the way position when not in use for drawing the vehicle.

The invention will be further readily understood from the following description and claims, and from the drawings, in which latter:—

Figure 1 represents a plan view of my improved device, partly broken away, and showing the pulling-handle in idle position.

Fig. 2 is a side elevation of the same with the near wheels removed, and showing the pulling-handle in idle position in full lines, and in position of use in dotted lines.

Fig. 3 is a front elevation of my improved device.

Fig. 4 is a bottom view of the head-end of the same.

Fig. 5 is a vertical cross-section of the steering-head taken on the line 5—5 of Fig. 4.

Fig. 6 is a vertical section of the same taken on the line 6—6 of Fig. 4.

Fig. 7 is a bottom view of the head-end of the vehicle, showing a modification of the means for mounting the pulling-handle.

Fig. 8 is a vertical cross-section of the same taken on the line 8—8 of Fig. 7.

Fig. 9 is a side elevation of the head-end of the vehicle showing a modification of the pulling-handle, the same being shown in idle position in full lines, and as extended forwardly in dotted lines.

Fig. 10 is a front elevation of the same, with the pulling-handle shown in forward position.

Fig. 11 is a vertical cross-section of the same, taken on the line 11—11 of Fig. 9; and, Fig. 12 is a side elevation of my improved device, partly broken away, showing the front axle in rear position.

21 represents the front axle and 22 the rear axle of the vehicle. Wheels 23 are journaled on the front axle and wheels 24 are supported by the rear axle. One or both of the wheels 24 may be fixed to the rear axle.

The front axle is represented as an axle which is square in cross-section and forms part of a front steering-head, which besides the front axle comprises a steering-support 25 fixed on the front axle, the steering-support being shown as an upwardly bowed strap fixed to the axle by means of rivets 26. The front axle has round ends on which the wheels turn.

31 represents the body of the vehicle, exemplified as having side straps 32 connected at their fronts by means of the bowed front end 33 of the straps. The side straps are connected by means of cross-straps 34, 35, 36, at the front portion of the vehicle, respectively connected with the side straps as by means of rivets 37, 38, 39. The rear ends of the side straps are connected by means of a cross-strap 40.

Bearings 41 are secured to the frame, the rear axle being journaled in said bearings. A pinion 46 is secured to the rear axle. A gear 47 meshes with the pinion and is journaled on a stud 48 fixed to one of the side straps 32 and has a crank-pin 49 thereon about which a bearing 50 of a link 51 is journaled, the forward end of the link being articulated at 52 with a propelling lever 53, shown as forked at its lower end as at 54, the tines of the fork being pivoted by means of bolts 55 to the side straps. The propelling lever is provided with a propelling handle 56.

A seat 58 is supported by the framing on uprights 59 rigidly secured to the side straps and to the seat.

A brace 61 connects with the steering-head, for instance, by having a bolt 62 pass through the front axle and an aperture in the front end of the brace, a nut 63 being received over the bolt, the rear end of the brace being secured to one of the cross-straps by means of a bolt 64 passing through apertures in said cross-strap and brace, a nut 65 being received over the bolt.

The framing of the body is pivoted to the steering-head by means of the bolt 62 and a bolt 66 passing through a hole in one of the cross-straps and a hole in the bow steering-support 25, being secured in place by means of a nut 67.

In the exemplification shown, the steering-head is adjustable for adjustably positioning the front axle toward and from the seat of the vehicle, for accomplishing which the steering-support 25 may be supported by the cross-strap 34 and the brace 61 secured to the cross-strap 35, as shown in Figs. 1, 2 and 6, or the steering-support may be supported by the cross-strap 35 and the brace 61 secured to the cross-strap 36, as shown in Fig. 12, by which latter arrangement the front axle 21 is brought closer to the rear of the vehicle, whereby a child having shorter legs may support its feet on the front axle, while operating the vehicle. The front axle may be shifted forwardly for being supported and braced from the cross-straps 34 and 35 if the growth of the child necessitates longer space between the seat and front axle.

I have shown convenient means whereby the character of propulsion of the vehicle may be changed by simple means. The vehicle may, for instance, be used by the child as a coaster. When so used, that is, when used in the ordinary manner of propulsion, the child will either propel or retard the propulsion of the vehicle by means of the propulsion lever 53. If the child desires to pull the vehicle, for instance, up-hill, or if it is desired to pull the child on the vehicle, convenient means are provided whereby this may be accomplished, these means being normally out-of-the-way and readily placed in position of use, and, when placed in position of use, will control the direction in which the front axle extends with relation to the body of the vehicle, for readily pulling the vehicle in a straight line or along curves, or around corners, as may be desired.

Referring to Figs. 1 to 5 inclusive, this is accomplished by means of a handle 71, shown as a bail-like structure. In practice it is bent out of a stiff wire in such manner as to have attaching means which are selectively connected with or disconnected from the vehicle, and having its sides spread sufficiently for clearance of the framing, operating lever and front seat portions of the vehicle, so as to be normally out of the way of the rider, but still in convenient position ready to be grasped for use when desired.

In the exemplification shown, the handle comprises side stretches 72 arranged when laid back to be located at the sides of and close to the front portions of the framing of the vehicle, so as not to interfere with the child's feet or legs, when the child rests its feet on the front axle. Adjacent to the front seat portion, the side stretches merge into sidewardly widening stretches 73, which merge into side stretches 74, spaced apart sufficiently to be received past the sides of the seat of the vehicle, the rear ends of the side stretches being connected by a cross-stretch 75.

The front portion of the handle 71 hangs idle adjacent to the front axle when the handle is positioned rearwardly, so that the front axle may be steered by the child's feet, and is automatically connected with the front axle, so as to steer the same, when the handle is placed in forward position.

The manner of accomplishing this, shown in Figs. 1 to 5 inclusive, is by means of bending the front ends of the side stretches 72 laterally or toward each other, as shown at 76, forming pintles received in bearings 77, 78, respectively in swivel pieces 79, 80 through apertures in which the front pivot-bolt 62 passes. In order to maintain the bearings 77, 78 in alinement, the swivel pieces are connected so as to maintain their relative longitudinal positions, accomplished in the present exemplification by flanges 81 struck up from the swivel-piece 80 and received against the front and rear edges of the swivel-piece 79.

The side stretches of the pulling handle are, at their front ends adjacent to their pivot points, provided with a bend 82 forming a stretch which makes contact with the steering-head, shown as received across the axle at each side of the pivotal connection of the latter with the body of the vehicle, as indicated in Figs. 2 and 5, whereby the handle 71, the swivel-pieces 79 and 80 and the axle and steering-head are practically formed into a rigid structure.

The positioning of the handle 71 in the relation stated, and its employment as a pulling-handle, does not interfere with the operation of the propelling lever 53 by the rider of the vehicle, so that the vehicle may simultaneously be pulled by a person walking on the ground or in other manner, and propelled by means of the propelling lever, or the vehicle may be propelled by the rider by means of the propelling lever 53 and the handle 71 placed in forward position for being employed as a suspension member from which articles, as a lantern, may be suspended, if desired.

I have, in Figs. 7 and 8, shown a modification of the connection of the pulling-handle with the front axle, in which modification the swivel-pieces 79, 80, are replaced by a swivel-piece 179 having lugs 180, 181, struck downwardly therefrom, and having bearings therein, in which the laterally bent pintles 76 of the handle 71 are received. In this modification the handle is arranged to be placed in inactive relation by arranging the same rearwardly, and in active relation by swinging the same forwardly, as in the description of the handle with relation to Figs. 1 to 5 inclusive.

In Figs. 9, 10 and 11, I have shown a further modification of my improved device, in which a pulling-handle 171 is employed, the handle having side stretches 172, similar to the side stretches 72, sidewardly widening stretches 173, similar to the sidewardly widening stretches 73, side stretches 174, similar to the side stretches 74, and a cross-stretch 175, similar to the cross-stretch 75.

At each of the front portions of the side stretches 172, the wire of the handle is bent with a reverse bend angularly with relation to the general direction of the handle, forming reversely bent stretches 91, 92, and a bearing 93, the reversely bent stretches 92 being connected by a cross-stretch 94. A pivot-piece 95 is pivoted by means of a bolt 166 between the steering-head and one of the forward cross straps 34, 35, connecting the sides of the framing of the body of the vehicle, depending on whether the axle is positioned in forward or rear position. The pivot-piece is provided at each of its ends with a flange 96, in which headed pins 97 are secured, the bearings 93 having bearing about said headed pins.

When the handle 171 is laid backwardly, the cross-stretch 94 is in a horizontal plane above the steering-head, (as shown in full lines in Fig. 9 and in Fig. 11), so that the front axle of the vehicle will have freedom to swivel in any desired direction, the handle lying in normal position out of the way of the rider, with its rear cross-stretch on the vehicle-seat, as described with relation to the structures of Figs. 1 to 8 inclusive. When the handle is swung into forward position, the front cross-stretch 94 of the handle will lie against the front edges of the steering-support 25, that is, against the front edges of the steering-head, (as shown in dotted lines in Fig. 9 and in Fig. 10), for controlling the direction in which the front axle extends, controlled by the action of the person pulling on the handle.

The pulling-handles may be of such length that the rear cross-stretches 75 and 175 thereof will lie upon the rear portion of the seat when in normal position in inactive relation, if the steering-head and its brace are supported from the forward cross-straps 34, 35. If the steering-head and brace are supported from the rear cross-straps 35, 36, thereby moving the pulling-handles when in inactive relation rearwardly, the rear cross-stretches 75 or 175 of the respective pulling-handles may pass the seat of the vehicle, so that the rear side stretches of the pulling-handles will rest upon the rear axle of the vehicle, when said handles are respectively in inactive relation.

Having thus fully described my invention, what I claim as new and desire to secure by Letters Patent, is:

1. In a vehicle of the character described, the combination of a body, a seat therefor, a steering-head pivoted to said body and comprising a front axle, a rear wheel, means for driving said rear wheel comprising an operating part adjacent to said seat, a pulling-handle for said vehicle, and a pivot-part to which said pulling-handle is pivoted, said pivot-part having a pivotal axis substantially parallel with the pivotal axis between said steering-head and said body, and a connection controlled by said pulling-handle for causing combined movement of said pulling-handle, said pivot-part and said steering-head on the pivotal axis between said steering-head and said body, and said pulling-handle arranged to be placed in idle relation for pivotal movement of said steering-head independent of said pivot-part.

2. In a vehicle of the character described, the combination of a body, a seat therefor, a steering-head comprising a front axle pivoted to said body, a rear wheel, means for driving said rear wheel comprising an operating part adjacent to said seat, a pivot-part, and a pulling-handle for said vehicle articulated with said pivot-part, the pivotal axes of said steering-head and said pivot-part being substantially parallel, said steering-head normally arranged to have steering movement with relation to said pivot-part, and said pulling-handle arranged to be shifted to pulling position whereby said pulling-handle and pivot-part are arranged in coactive steering relation with said steering-head for steering said steering-head.

3. In a vehicle of the character described, the combination of a body, a seat therefor, a steering-head pivoted to said body and comprising a front axle, a rear wheel, means for driving said rear wheel comprising an operating part adjacent to said seat, a pivot-part having a pivotal axis coincident with the pivotal axis of said steering-head, and a pulling-handle for said vehicle articulated with said pivot-part, said pulling-handle being normally in idle relation whereby said steering-head has pivotal movement with relation to said pivot-part, and said pulling-handle comprising a part coacting with said steering-head for causing coactive movement of said steering-head with said pivot-part.

4. In a vehicle of the character described, the combination of a body, a seat therefor, a steering-head comprising a front axle, a brace to which said steering-head is pivoted, a rear wheel, means for driving said rear wheel comprising an operating part adjacent to said seat, a pivot-part, the pivotal axes of said steering-head and pivot-part being substantially parallel, a bail-like pulling-handle for said vehicle articulated with said pivot-part and arranged to be swung back past said operating part, said steering-head normally arranged to have steering movement with relation to said pivot-part and operative connection between said pulling-handle and said steering-head, said pulling-handle arranged to be swung forwardly to pulling position past said operating part whereby said operative connection is moved into connecting relation with said steering-head and said pulling handle and pivot part are arranged in coactive steering relation with said steering-head for steering said steering-head.

In testimony whereof, I have hereunto signed my name in the presence of two subscribing witnesses.

WILLIAM J. BAKER.

Witnesses:
COLEMAN AVERY,
THERESA M. SILBER.

Copies of this patent may be obtained for five cents each, by addressing the "Commissioner of Patents, Washington, D. C."